US008608908B2

(12) United States Patent
Koenig et al.

(10) Patent No.: US 8,608,908 B2
(45) Date of Patent: Dec. 17, 2013

(54) METHOD AND SYSTEM USING LOW FATTY ACID STARCHES IN PAPER SIZING COMPOSITION TO INHIBIT DEPOSITION OF MULTIVALENT FATTY ACID SALTS

(75) Inventors: Michael F. Koenig, Loveland, OH (US); Ascencion L. Koenig, Loveland, OH (US); Ewa Gertruda Bucher, Lebanon, OH (US)

(73) Assignee: International Paper Company, Memphis, TN (US)

( * ) Notice: Subject to any disclaimer, the term of this patent is extended or adjusted under 35 U.S.C. 154(b) by 362 days.

(21) Appl. No.: 12/753,506

(22) Filed: Apr. 2, 2010

(65) Prior Publication Data

US 2011/0240242 A1    Oct. 6, 2011

(51) Int. Cl.
*D21H 17/28* (2006.01)
*D21H 23/22* (2006.01)
*C08B 30/00* (2006.01)

(52) U.S. Cl.
USPC ........ 162/179; 162/158; 162/175; 162/181.2; 162/184; 162/135; 106/162.1; 106/206.1; 106/217.9; 127/67; 127/70; 127/71

(58) Field of Classification Search
USPC ........... 162/158, 135, 175, 179, 181.1, 181.2, 162/184; 106/162.1, 206.1, 217.9; 127/65–71
See application file for complete search history.

(56) References Cited

U.S. PATENT DOCUMENTS

| | | | |
|---|---|---|---|
| 3,485,668 A * | 12/1969 | Kunze | 127/71 |
| 3,600,385 A | 8/1971 | Loffelman | |
| 3,719,514 A | 3/1973 | Taylor | |
| 3,720,662 A * | 3/1973 | Rutenberg et al. | 536/110 |
| 3,850,834 A | 11/1974 | Hellsten et al. | |
| 3,956,283 A | 5/1976 | Fleck | |
| 4,721,655 A | 1/1988 | Trzasko | |
| 4,872,951 A * | 10/1989 | Maliczyszyn et al. | 162/135 |
| 5,429,860 A | 7/1995 | Held et al. | |
| 5,620,510 A | 4/1997 | Mentzer et al. | |
| 6,001,166 A | 12/1999 | Ettl et al. | |

(Continued)

FOREIGN PATENT DOCUMENTS

| | | |
|---|---|---|
| EP | 0652324 | 5/1995 |
| EP | 0747235 | 12/1996 |

(Continued)

OTHER PUBLICATIONS

BeMiller et al, "Starch", Ullmann's Encyclopedia of Industrial Chemistry, vol. 34, pp. 113-117. [online] John Wiley & Sons, Inc. 2011 [retrieved on May 16, 2012] Retrieved from the Internet<URL: http://onlinelibrary.wiley.com/doi/10.1002/14356007.a25_001.pub4/full>.*

(Continued)

*Primary Examiner* — Dennis Cordray
(74) *Attorney, Agent, or Firm* — Thomas W. Barnes, III; Eric W. Guttag

(57) ABSTRACT

A method for inhibiting deposition of multivalent saturated fatty acids on paper sizing equipment and/or devices which use a paper surface sizing composition containing higher starch solids levels of surface sizing starches and a source of multivalent cations, such as a multivalent metal drying salt, by including (wholly or partially) one or more low fatty acid surface sizing starches in the paper surface sizing composition. Also, a paper surface sizing system for carrying out this method.

18 Claims, 4 Drawing Sheets

(56) References Cited

U.S. PATENT DOCUMENTS

| | | | |
|---|---|---|---|
| 6,162,328 | A | 12/2000 | Cennisio et al. |
| 6,207,258 | B1 | 3/2001 | Varnell |
| 6,365,002 | B1 | 4/2002 | Bindzus et al. |
| 6,764,726 | B1 | 7/2004 | Yang et al. |
| 6,855,198 | B2 * | 2/2005 | Anderson et al. .......... 106/206.1 |
| 7,011,729 | B2 | 3/2006 | Strong et al. |
| 7,294,190 | B2 | 11/2007 | Dyllick-Brenzinger et al. |
| 7,582,188 | B2 | 9/2009 | Stoffel et al. |
| 7,625,441 | B2 | 12/2009 | Gagnon et al. |
| 7,625,962 | B2 | 12/2009 | Laleg |
| 7,736,466 | B2 | 6/2010 | Singh et al. |
| 7,967,953 | B2 | 6/2011 | Singh et al. |
| 8,012,551 | B2 | 9/2011 | Song et al. |
| 8,123,907 | B2 | 2/2012 | Stoffel et al. |
| 2002/0117168 | A1 * | 8/2002 | Foster ........................ 127/71 |
| 2002/0170693 | A1 | 11/2002 | Merrette et al. |
| 2003/0227531 | A1 | 12/2003 | Hosoi |
| 2004/0123776 | A1 | 7/2004 | Anderson et al. |
| 2005/0124755 | A1 | 6/2005 | Mitchell |
| 2005/0252629 | A1 | 11/2005 | Laleg |
| 2006/0042768 | A1 | 3/2006 | Brown et al. |
| 2006/0051528 | A1 | 3/2006 | Ogino et al. |
| 2006/0174801 | A1 | 8/2006 | Gagnon et al. |
| 2006/0254738 | A1 | 11/2006 | Anderson et al. |
| 2007/0087134 | A1 | 4/2007 | Tyan et al. |
| 2007/0087138 | A1 * | 4/2007 | Koenig et al. ............... 428/32.21 |
| 2007/0243403 | A1 | 10/2007 | Matsuda et al. |
| 2008/0098931 | A1 | 5/2008 | Skaggs et al. |
| 2008/0163993 | A1 * | 7/2008 | Varnell ........................ 162/135 |
| 2008/0173420 | A1 | 7/2008 | Song et al. |
| 2008/0289786 | A1 | 11/2008 | Koenig et al. |
| 2009/0017334 | A1 | 1/2009 | Kurihara et al. |
| 2009/0274855 | A1 | 11/2009 | Koenig et al. |
| 2009/0295892 | A1 | 12/2009 | Akiyama |
| 2009/0320708 | A1 | 12/2009 | Jackson et al. |
| 2010/0129553 | A1 | 5/2010 | Jackson et al. |
| 2011/0151148 | A1 | 6/2011 | Koenig et al. |
| 2011/0151149 | A1 | 6/2011 | Koenig |
| 2011/0205287 | A1 * | 8/2011 | Zhou et al. ....................... 347/20 |
| 2011/0240241 | A1 | 10/2011 | Koenig et al. |
| 2011/0240242 | A1 | 10/2011 | Koenig et al. |
| 2011/0274856 | A1 | 11/2011 | Koenig et al. |
| 2012/0019587 | A1 | 1/2012 | Koenig |
| 2012/0121872 | A1 | 5/2012 | Koenig |

FOREIGN PATENT DOCUMENTS

| | | |
|---|---|---|
| EP | 1036666 | 9/2000 |
| EP | 1079356 | 2/2001 |
| EP | 1122085 | 8/2001 |
| EP | 1355004 | 10/2003 |
| EP | 1566281 | 8/2005 |
| EP | 1571149 | 9/2005 |
| EP | 1712677 | 10/2006 |
| EP | 1743976 | 1/2007 |
| EP | 1775141 | 4/2007 |
| EP | 1947240 | 7/2008 |
| JP | 2002274012 | 9/2002 |
| JP | 2004255593 | 6/2004 |
| JP | 2006168017 | 6/2006 |
| WO | 9609345 | 3/1996 |
| WO | 9906219 | 2/1999 |
| WO | 9916973 | 4/1999 |
| WO | 03044275 | 5/2003 |
| WO | 2005115763 | 12/2005 |
| WO | 2006049545 | 5/2006 |
| WO | 2006110751 | 10/2006 |
| WO | 2007053681 | 5/2007 |
| WO | 2007141271 | 12/2007 |
| WO | 2008055858 | 5/2008 |
| WO | 2009110910 | 9/2009 |
| WO | 2009124075 | 10/2009 |
| WO | 2009146416 | 12/2009 |
| WO | WO 2010/044795 A1 * | 4/2010 |

OTHER PUBLICATIONS

H. C. Borghetty and C. A. Bergman, The Journal of the American Oil Chemists' Society, Mar. 1950, Synthetic Detergents in the Soap Industry, pp. 88-90.

William R. Morrison, Journal of Cereal Science 8 (1998) pp. 1-15, Lipids in Cereal Starches: A Review.

G. A. Smook, Handbook for Pulp and Paper Technologists, 2nd edition, 1992, chapter 13 pp. 194-208, chapter 18 pp. 283-296.

Quantitative Determination of Alkyl Ketene dimer AKD retention in Paper made on a Pilot Paper Machine, p. 253-260, (2002).

Automataic Color recognition System for Stockigt Sizing Test II, Journal of Korea TAPPI, 371, 73-81, 2005.

C. E. Farley; R. B. Wasser. The Sizing of Paper. TAPPI Press, 1989, 51-62.

Paper and board—Determination of sizing—Stoeckigt method, JIS p. 8122: 2004, rev. Mar. 20, 2004, published by Japanese Standards Association.

Chemistry and Application of Rosin Size, E. Strazdins, pp. 1-31.

Use of T530 (HST) on calcium carbonate-containing papers, Stever R. Boone, 1996, Tappi Journal, pp. 122-124.

Tracing Tecnique in Geohydrology by Werner Kass and Horst Behrens, published by Taylor Francis, 1998, pp. 48-55.

Sythetic Detergents in the Soap Industry Lime Soap Dispersion Test, H.C. Borghetty et al., J. Am. Oil, Chem. Soc., 27:88-90 1950.

High Solids Modified Calcium Carbonates a Concept for Inkjet Papers, Varney Kukkamo, May 2010.

Pigment Coating Techniques, Chapter 24, p. 415-417, Jukka Linnonmaa and Michael Trefz.

* cited by examiner

METHOD AND SYSTEM USING LOW FATTY ACID STARCHES IN PAPER SIZING COMPOSITION TO INHIBIT DEPOSITION OF MULTIVALENT FATTY ACID SALTS

FIELD OF THE INVENTION

The present invention broadly relates to a method for inhibiting the deposition of multivalent $C_{16}$ or higher saturated fatty acid salts in a paper surface sizing system by using (wholly or partially) one or more low fatty acid surface sizing starches in a paper surface sizing composition comprising higher starch solids levels of surface sizing starches. The present invention further broadly relates to a paper surface sizing system for carrying out this method.

BACKGROUND

In conventional calendered papermaking for providing papers used in printing, a fibrous web may prepared from an aqueous solids mixture which may comprise wood pulp and/or synthetic fibers along with various additives such as sizing agents, binders, fillers, pigments, etc. Sizing agents are used primarily to prevent excess penetration, wicking, spreading, resistance to blotting etc., of water or ink, and especially internal absorption of the water or ink by the resulting paper substrate. The sized paper substrate may exhibit improved properties in terms of, for example, print density, because more of the dye or pigment present in the ink remains on the surface of the paper substrate, rather than being absorbed internally by the paper substrate.

There are two basic methods for sizing paper substrates: internal paper sizing and surface paper sizing. In internal paper sizing, an internal sizing agent is included, added, etc., during the papermaking process before the fibrous paper substrate is formed. These internal sizing agents may include rosin soap sizes, rosin emulsion sizes, alkyl ketene dimers, alkenyl succinic anhydrides, etc. Internal sizing agents may also be referred to as "reactive sizing" agents due to reactions of these internal sizing agents which occur during the papermaking process to enable the molecules of the internal sizing agent to be retained, anchored, incorporated, oriented, etc., within or by the paper substrate.

In surface paper sizing, a surface sizing agent is coated on, applied to, etc., one, or more often both surfaces of the already formed paper substrate, often in the form of a sizing solution comprising the surface sizing agent. The most common surface sizing agent used in such solutions is starch which may be either in a cooked or modified form (e.g., oxidized or enzyme converted). This surface starch sizing solution may be applied to the surface(s) of the paper substrate by using a device called a size press. A conventional size press comprises two adjacent and cooperating applicator rolls which are fairly close together to define a nip and may be in a vertical, horizontal, inclined, etc., configuration.

During the size press operation, the paper substrate to be sized is fed through the nip between the two applicator rolls of the size press. The surface starch sizing solution may be sprayed towards the nip of the size press to create a flooded or "pond" region of the sizing solution which then coats, is absorbed onto, etc., the surface(s) of the paper substrate as the paper substrate passes through the nip. In the case of a metering size press, the paper surface sizing composition may be transferred from paper surface sizing composition supply reservoirs by take up rolls to the applicator rolls. The amount of paper surface sizing composition transferred to the applicator rolls may be controlled by a metering rod which spreads the paper surface sizing composition before being applied to the surface(s) of the paper substrate.

In addition to size presses, the surface starch sizing solution may also be applied to the surface(s) of the paper substrate by other methods or devices, such as by dip coating, slot extrusion, etc. In dip coating, the paper substrate may be transported below the surface of the starch sizing solution by a single roll such that the surface(s) of the paper substrate are saturated, followed by removal of any excess starch sizing solution by passing the saturated paper substrate through squeeze rolls and then drying (e.g., by an air dryer). In slot extrusion, the paper substrate may be passed through die lips of a flat die in close proximity to provide a continuous film of starch sizing solution evenly distributed across one surface of the paper substrate, followed by drying (e.g., with an air dryer), and then repeating the slot extrusion operation to treat the other surface of the paper substrate with the starch sizing solution.

In recent years, the use of ink-jet printing methods has been increasing at a rapid rate. Ink jet printing is a method for forming ink images on a paper substrate from deposited droplets of ink comprising dyes or pigments. This printing method enables high-speed and full-color printing to be achieved. In ink jet printing, the fine droplets of ink are sprayed or jetted from printing nozzles at a high speed so as to direct the ink droplets toward, and deposit these droplets on, the paper substrate to provide printed images on the paper substrate.

The ink used in ink jet printing may contain a large quantity of solvent. In the case of inks comprising pigments, the ink may also be in the form of a pigment emulsion. The presence of large quantities of solvent in the ink, or the use of pigment emulsions in the ink, may increase the dry time for the ink droplets deposited on the surface of the paper substrate, and may thus lead to, for example, smearing of the deposited ink droplets. Ink dry time may particularly increase when the ink droplets are deposited onto the surface(s) of a paper substrate which has been treated with an internal and/or surface sizing agents.

To decrease dry time of internal/surface sized paper substrates during ink jet printing, the paper substrate may be treated with a drying agent. These drying agents may include monovalent metal drying salts (e.g., sodium chloride, etc.) or multivalent metal drying salts (e.g., calcium chloride, magnesium chloride, aluminum chloride, etc.) The drying agent is often applied to the surface(s) of a paper substrate at the same time as the surface sizing solution, but may also be applied after the surface sizing solution is applied to the surface(s) of a paper substrate. The drying agent may be incorporated in the surface starch sizing solution which is then applied to the surface(s) of a paper substrate (e.g., by the "pond" at the nip of a size press) or may be applied to the surface(s) of the paper substrate separately from the surface starch sizing solution. The presence of these metal drying salts on the paper substrate surface destabilizes the pigment emulsion in the ink droplets deposited by an ink jet printer. The resulting destabilization of the pigment emulsion causes precipitation of pigment particles, thus resulting in a faster and improved dry time.

SUMMARY

According to a first broad aspect of the present invention, there is provided a method comprising the following steps of:
(a) providing a cooked paper surface sizing composition comprising above about 10% cooked surface sizing starch solids and no more than about 300 ppm $C_{16}$ or higher saturated fatty acids, wherein the cooked surface sizing starch solids comprise from 0 to about 95% high fatty acid surface sizing starch and from about 5 to 100% low fatty acid surface sizing starch; and (b) treating at least one surface of a paper substrate with the cooked paper surface sizing composition to thereby provide a surface sizing coating on the at least one surface, wherein the at least one surface is also treated with a source of multivalent cations at a level of at least about 1000 ppm.

According to a second broad aspect of the present invention, there is provided a system comprising:

a source of a paper surface sizing composition comprising above about 10% surface sizing starch solids, wherein the surface sizing starch solids comprise from 0 to about 95% high fatty acid surface sizing starch and from about 5 to 100% low fatty acid surface sizing starch;

a starch cooking stage which cooks the surface sizing starch solids in the paper surface sizing composition and thus liberates no more than about 300 ppm $C_{16}$ or higher saturated fatty acids;

a fatty acid neutralization stage which neutralizes and converts the liberated total fatty acids in the cooked paper surface sizing composition to monovalent fatty acid salts;

a source of a multivalent metal drying salt; and a paper surface sizing device wherein at least one surface of a paper substrate is treated with the neutralized paper surface sizing composition and the multivalent metal drying salt, wherein the multivalent metal drying salt is in an amount which provides multivalent cations at a level of at least about 1000 ppm.

BRIEF DESCRIPTION OF THE DRAWINGS

The invention will be described in conjunction with the accompanying drawings, in which.

DETAILED DESCRIPTION

Figure 1:
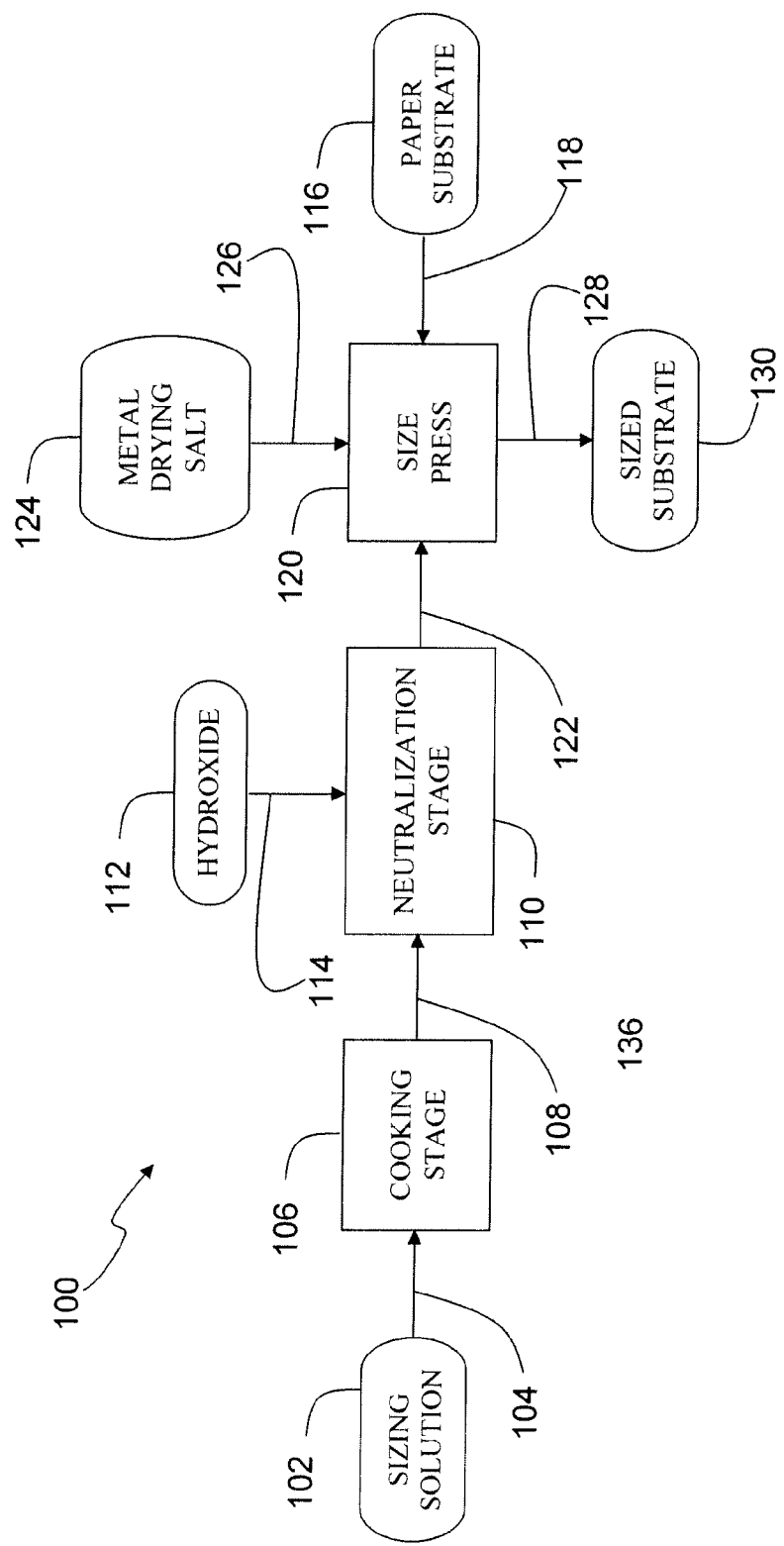
FIG. 1 is a schematic block diagram illustrating an embodiment of a paper surface sizing system.

It is advantageous to define several terms before describing the invention. It should be appreciated that the following definitions are used throughout this application.

Definitions

Where the definition of terms departs from the commonly used meaning of the term, applicant intends to utilize the definitions provided below, unless specifically indicated.

For the purposes of the present invention, directional terms such as "top", "bottom", "side," "front," "frontal," "forward," "rear," "rearward," "back," "trailing," "above", "below", "left", "right", "horizontal", "vertical", "upward", "downward", etc. are merely used for convenience in describing the various embodiments of the present invention. The embodiments of the present invention illustrated in, for example, FIGS. 2-4, may be oriented in various ways.

For the purposes of the present invention, the term "printable substrate" refers to any paper substrate which may be printed on with an ink jet printing process, a laser printing process, etc. Printable substrates may include webs, sheets, strips, etc., may be in the form of a continuous roll, a discrete sheet, etc.

For the purposes of the present invention, the term "paper substrate" refers to a fibrous web that may be formed, created, produced, etc., from a mixture, furnish, etc., comprising paper fibers, internal paper sizing agents, etc., plus any other optional papermaking additives such as, for example, fillers, wet-strength agents, optical brightening agents (or fluorescent whitening agent), etc. The paper substrate may be in the form of a continuous roll, a discrete sheet, etc.

For the purposes of the present invention, the term "paper filler" refers commonly to mineral products (e.g., calcium carbonate, kaolin clay, etc.) which may be used in paper making to reduce materials cost per unit mass of the paper, increase opacity, increase smoothness, etc. These mineral products may be finely divided, for example, the size range of from about 0.5 to about 5 microns.

For the purposes of the present invention, the term "unsized paper substrate" refers to a paper substrate which has 0 or substantially 0 paper surface loading of a paper surface sizing composition present on one or both sides or surfaces of the paper substrate.

For the purposes of the present invention, the term "single-side sized paper substrate" refers to a paper substrate which has a surface loading of a paper surface sizing composition present on one, but not both, sides or surfaces of the paper substrate.

For the purposes of the present invention, the term "double-side sized paper substrate" refers to a paper substrate which has a surface loading of a paper surface sizing composition present on both sides or surfaces of the paper substrate.

For the purposes of the present invention, the term "calendered paper" refers to a paper substrate which has been subjected to calendering to, for example, smooth out the paper for enabling printing and writing on the paper, and to increase the gloss on the paper surface. For example, calendering may involve a process of using pressure for embossing a smooth surface on the still rough paper surface. Calendering of paper may be carried out on a calendar which may comprise a series of rolls at the end of a papermaking machine (on-line), or separate from the papermaking machine (off-line).

For the purposes of the present invention, the term "paper surface sizing composition" refers to those compositions, which comprise, at minimum, one or more surface sizing starches. These paper surface sizing compositions may also include other optional additives, such as, for example, a calcium carbonate pigment component, plastic pigments, substrate pigment binders, paper surface sizing agents other than a surface sizing starch, cationic dye fixing agents, solvents, diluents, anti-scratch and mar resistance agents, optical brightening agents (OBAs), defoamers, rheology modifiers, dispersants, surfactants, etc. The paper surface sizing composition may be formulated as an aqueous solution, an aqueous slurry, a colloidal suspension, a liquid mixture, a thixotropic mixture, etc. The paper surface sizing composition may also have added to it one or more multivalent metal drying salts, for example, prior to treating the one or more surfaces of the paper substrate with the paper surface sizing composition.

For the purposes of the present invention, the term "solids basis" refers to the weight percentage of each of the respective solid materials (e.g., surface sizing starch(es)); calcium carbonate pigment component; a cationic dye fixing agent; plastic pigment, other surface paper sizing agent, etc.) present in the paper surface sizing composition, the paper surface sizing coating, etc., in the absence of any liquids (e.g., water). Unless otherwise specified, all percentages given herein for the solid materials are on a solids basis.

For the purposes of the present invention, the term "solids content" refers to the percentage of non-volatile, non-liquid components (by weight) that are present in the composition, etc.

For the purposes of the present invention, the term "substrate pigment" refers to a material (e.g., a finely divided particulate matter) which may be used or may be intended to be used to affect optical properties of a printable substrate.

For the purposes of the present invention, the term "calcium carbonate" refers various calcium carbonates which may be used as substrate pigments, such as precipitated calcium carbonate (PCC), ground calcium carbonate (GCC), modified PCC and/or GCC, etc.

For the purposes of the present invention, the term "precipitated calcium carbonate (PCC)" refers to a calcium carbonate which may be manufactured by a precipitation reaction and which may used as a substrate pigment. PCC may comprise almost entirely of the calcite crystal form of $CaCO_3$. The calcite crystal may have several different macroscopic shapes depending on the conditions of production. Precipitated calcium carbonates may be prepared by the carbonation, with carbon dioxide ($CO_2$) gas, of an aqueous slurry of calcium hydroxide ("milk of lime"). The starting material for obtaining PCC may comprise limestone, but may also be calcined (i.e., heated to drive off $CO_2$), thus producing burnt lime, CaO. Water may added to "slake" the lime, with the resulting "milk of lime," a suspension of $Ca(OH)_2$, being then exposed to bubbles of $CO_2$ gas. Cool temperatures during addition of the $CO_2$ tend to produce rhombohedral (blocky) PCC particles. Warmer temperatures during addition of the $CO_2$ tend to produce scalenohedral (rosette-shaped) PCC particles. In either case, the end the reaction occurs at an optimum pH where the milk of lime has been effectively converted to $CaCO_3$, and before the concentration of $CO_2$ becomes high enough to acidify the suspension and cause some of it to redissolve. In cases where the PCC is not continuously agitated or stored for many days, it may be necessary to add more than a trace of such anionic dispersants as polyphosphates. Wet PCC may have a weak cationic colloidal charge. By contrast, dried PCC may be similar to most ground $CaCO_3$ products in having a negative charge, depending on whether dispersants have been used. The calcium carbonate may be precipitated from an aqueous solution in three different crystal forms: the vaterite form which is thermodynamically unstable, the calcite form which is the most stable and the most abundant in nature, and the aragonite form which is metastable under normal ambient conditions of temperature and pressure, but which may convert to calcite at elevated temperatures. The aragonite form has an orthorhombic shape that crystallizes as long, thin needles that may be either aggregated or unaggregated. The calcite form may exist in several different shapes of which the most commonly found are the rhombohedral shape having crystals that may be either aggregated or unaggregated and the scalenohedral shape having crystals that are generally unaggregated.

For the purposes of the present invention, the term "low particulate surface area" with reference to the calcium carbonate pigment refers to a BET specific surface area of about 30 meters square per gram (hereinafter "msg") or less, for example, from about 5 to about 30 msg, more typically from about 8 to about 16 msg.

For the purposes of the present invention, the term "high particulate surface area" with reference to the calcium carbonate pigment refers to a BET specific surface area of greater than about 30 meters square per gram (hereinafter "msg"), for example, from about 30 to about 200 msg, more typically from about 50 to about 120 msg.

For the purposes of the present invention, the term "substrate pigment binder" refers to a binder agent for paper substrates which may be used to improve the substrate pigment binding strength of the paper surface sizing composition, coating, etc. Substrate pigment binders may be hydrophilic. Suitable substrate pigment binders may include synthetic or naturally occurring polymers (or a combination of different polymers), for example, a polyvinyl alcohol (PVOH), proteinaceous adhesives such as, for example, casein or soy proteins, etc.; modified cellulosics such as methyl cellulose, ethyl cellulose, etc; polymer latexes such as styrene butadiene rubber latexes, acrylic polymer latexes, polyvinyl acetate latexes, styrene acrylic copolymer latexes, etc., or a combination thereof. The substrate pigment binder may also be substantially free of latexes as binders to improve the dry time of the surface sized printable substrate and to improve the processability of the printable substrate during the paper surface sizing process.

For the purposes of the present invention, the term "substantially free" refers to a paper surface sizing composition, paper surface sizing coating, etc., having less than about 0.1% of a particular component by weight of the paper surface sizing composition, paper surface sizing coating, etc.

For the purposes of the present invention, the term "level of paper sizing," unless otherwise indicated, may refer to the paper sizing level present in and/or on the paper substrate, and may comprise internal sizing, surface sizing, or both internal sizing and surface sizing.

For the purposes of the present invention, the term "internal sizing" refers to paper sizing present in the paper substrate due to internal sizing agents which are included, added, etc., during the papermaking process before a fibrous paper substrate is formed. Internal paper sizing agents generally resist penetration of water or other liquids into the paper substrate by reacting with the paper substrate to make the paper substrate more hydrophobic. Illustrative internal paper sizing agents may include, for example, alkyl ketene dimers, alkenyl succinic anhydrides, etc.

For the purposes of the present invention, the term "surface sizing" refers to paper sizing present on the paper substrate due to surface sizing agents which are applied on, added to, etc., the surface of the formed fibrous paper substrate. Paper surface sizing agents generally resist penetration of water or other liquids into the paper substrate by covering the paper substrate with a more hydrophobic film. Illustrative surface paper sizing agents may include, for example, one or more of surface sizing starches, styrene maleic anhydride copolymers, styrene acrylates, etc.

For the purposes of the present invention, the term "surface sizing starch" refers to surface sizing agents for paper substrates which comprise one or more natural starches (i.e., unmodified starches obtained from plant sources such as maize (corn), wheat, rice, potato, tapioca, etc.) such as cereal starches (e.g., maize (corn) starch, wheat starch, rice starch, potato starch, oat starch, rye starch, barley starch, millet sorghum starch, etc.) and non-cereal starches (e.g., tapioca starch, etc.), modified natural starches (e.g., ethylated starches, oxidized starches, etc.), or combinations thereof.

Modified starches may be obtained by one or more chemical treatments known in the paper sizing starch art, for example, by oxidation to convert some of —CH$_2$OH groups to —COOH groups, etc. In some cases the modified starch may have a small proportion of acetyl groups. Alternatively, the starch may be chemically modified to render it cationic (i.e., a cationic starch) or amphoteric (i.e., an amphoteric starch), i.e., with both cationic and anionic charges. The modified starches may also include starches converted to a starch ether, or a hydroxyalkylated starch by replacing some —OH groups with, for example, —OCH$_2$CH$_2$OH groups (i.e., a hydroxyethylated starch), —OCH2CH$_3$ groups (i.e., an ethylated starch), —OCH$_2$CH$_2$CH$_2$OH groups (i.e., a propylated starch), etc.

For the purposes of the present invention, the term "high fatty acid surface sizing starch" refers to those surface sizing starches which liberate substantial levels of fatty acids, and especially saturated fatty acids, when cooked. Such high fatty acid surface sizing starches may liberate (based on total starch solids), for example, as much as up to about 1% total fatty acids (i.e. all saturated and unsaturated fatty acids liberated), e.g., up to as much as about 0.8% total fatty acids. These liberated total fatty acids (based on total starch solids) may comprise, for example, as much as up to about 0.6% total saturated fatty acids (i.e. all saturated fatty acids liberated), e.g., up to as much as about 0.5% total saturated fatty acids. These liberated total saturated fatty acids (based on total starch solids) may comprise, for example, as much as up to about 0.4% C$_{16}$ or higher saturated fatty acids, e.g., up to as much as about 0.3% C$_{16}$ or higher saturated fatty acids. Illustrative high fatty acid surface sizing starch may include non-waxy cereal starches, such as non-waxy corn starch, non-waxy wheat starch, non-waxy rice starch, non-waxy potato starch, non-waxy oat starch, non-waxy rye starch, non-waxy barley starch, non-waxy millet sorghum starch, etc. Such non-waxy cereal starches comprise starch solids which comprise substantial amounts of amylose (e.g., at least about 25% amylose relative to the total amount of amylose and amylopectin), and liberate (relative to low fatty acid starches such as tapioca or waxy cereal starches) substantial amounts of fatty acids when cooked, especially C$_{16}$ or higher saturated fatty acids.

For the purposes of the present invention, the term "low fatty acid surface sizing starch" refers to those surface sizing starches which do not liberate substantial levels of fatty acids, and especially saturated fatty acids, when cooked. For example, when cooked, low fatty acid surface sizing starches (based on total starch solids) tend to liberate only from about 20 to about 50% of the total (e.g., saturated) fatty acids liberated by high fatty acid surface sizing starches. The range of total (e.g., saturated) fatty acids liberated may vary depending upon the particular low fatty acid surface sizing starch involved, with surface sizing starches such as tapioca, waxy rice, waxy maize, etc., being on the lower end of the total (saturated) fatty acid range, while surface sizing starches such as waxy barley starches, waxy millet sorghum starches, etc., tend to be on the higher end of the total (e.g., saturated) fatty acid range. When cooked, these low fatty acid surface sizing starches may liberate (based on total starch solids), for example, no more than about 0.5% total fatty acids, e.g., no more than about 0.4% total fatty acids. When cooked, these low fatty acid surface sizing starches also liberate (based on total starch solids), for example, no more than about 0.3% total saturated fatty acids (including C$_{16}$ or higher saturated fatty acids), e.g., no more than about 0.2% total saturated fatty acids. Illustrative low fatty acid surface sizing starches may include non-cereal starches such as tapioca starch, etc., waxy cereal starches such as waxy maize (corn) starch, waxy rice starch, waxy potato starch, waxy wheat starch, waxy oat starch, waxy rye starch, waxy barley starch, waxy millet sorghum starch, etc. Non-cereal starches such as tapioca starch, as well as the waxy cereal starches, comprise starch solids which primarily comprise amylopectin and minimal amylose, (e.g., at least about 80% amylopectin and less than about 20% amylose relative to the total amount of amylopectin and amylose), and liberate (relative to high fatty acid starches such as non-waxy cereal starches) substantially lower amounts of fatty acids (e.g., less than about 0.2% based on total starch solids), especially C$_{16}$ or higher saturated fatty acids, when cooked.

For the purposes of the present invention, the term "C$_{16}$ or higher saturated fatty acid" refers to fatty acids having 16 or more carbon atoms. These C$_{16}$ or higher saturated fatty acids may include palmitic acid, stearic acid, arachidic acid, behenic acid, etc., as well as mixtures of such saturated fatty acids.

For the purposes of the present invention, the term "monovalent saturated fatty acid salts" refers to salts formed by the reaction of monovalent hydroxides with saturated fatty acids, including C$_{16}$ or higher saturated fatty acids.

For the purposes of the present invention, the term "monovalent hydroxide" refers to hydroxides which have a monovalent cation, for example, sodium hydroxide, potassium hydroxide, lithium hydroxide, ammonium hydroxide, etc., as well as mixtures thereof.

For the purposes of the present invention, the term "multivalent saturated fatty acid salts" refers to salts formed from the combination, reaction, etc., of multivalent cations (e.g., from multivalent metal drying salts) with saturated fatty acids, including C$_{16}$ or higher saturated fatty acids, or the respective monovalent salts of such saturated fatty acids.

For the purposes of the present invention, the term "starch cooking" refers to heating the starch (e.g., starch granules) to a temperature sufficient to enable water to penetrate the starch granules and thus cause these cooked granules to swell to provide a gelatinized paste or solution of cooked starch solids. Starch cooking may be carried out in either a batch or continuous manner by using, for example, direct steam injection, circulation through a heat exchanger, etc., to heat the starch to temperatures in the range of, for example, from about 85° to about 100° C. for at least about 20 min., such as from about 88° to about 93° C. for from about 20 to about 30 minutes. See G. A. Smook, Handbook for Pulp and Paper Technologists (2$^{nd}$ Edition, 1992), pages 286-87, the entire contents and disclosure of which is herein incorporated by reference, for a general description of starch cooking that may be useful herein.

For the purposes of the present invention, the term "fatty acid neutralization" refers to adding monovalent hydroxide to a paper surface sizing composition comprising fatty acids liberated from cooked starch to neutralize these liberated fatty acids by raising the pH of the paper surface sizing composition to upward of a pH of about 9, for example, a pH in the range of from about 6 to about 9 (e.g., from about 6.5 to about 8). As a result of neutralization, these liberated fatty acids are converted, wholly or at least partially, to monovalent fatty acid salts. Neutralization may also be required if acidic compounds, such as ammonium persulfate (AP), are used to facilitate cooking of the starch and for viscosity control.

For the purposes of the present invention, the term "inhibits the deposition of multivalent C$_{16}$ or higher saturated fatty acid salts" refers to inhibiting, minimizing, reducing, eliminating, preventing, etc., the deposition of such fatty acid salts on paper surface sizing equipment or paper surface sizing devices. Embodiments of the methods and systems may inhibit such deposition such that the presence of such fatty acid salts on paper surface sizing equipment or paper surface sizing devices is, for example, less than about 400 ppm (e.g., less than about 300 ppm).

For the purposes of the present invention, the term "paper surface sizing equipment" refers to any equipment used in a paper surface sizing system. Such equipment may include paper surface sizing devices, starch cookers, fatty acid neutralizers, etc.

For the purposes of the present invention, the term "paper surface sizing device" refers to those devices, apparatus, machines, etc., which may be used to treat, apply, coat, etc., paper surface sizing compositions to one or more sides or surfaces of a paper substrate. Paper surface sizing devices may include air-knife coaters, rod coaters, blade coaters, size presses, dip coaters, slot extrusion coaters, etc. See G. A. Smook, Handbook for Pulp and Paper Technologists ($2^{nd}$ Edition, 1992), pages 283-94, the entire contents and disclosure of which is herein incorporated by reference, for a general description of size presses, coaters, etc., that may be useful herein. Size presses may include a puddle size press, a metering size press, etc. See G. A. Smook, Handbook for Pulp and Paper Technologists ($2^{nd}$ Edition, 1992), pages 283-85, the entire contents and disclosure of which is herein incorporated by reference, for a general description of size presses that may be useful herein.

For the purpose of the present invention, the term "treating" with reference to the paper surface sizing composition may include adding, depositing, applying, spraying, coating, daubing, spreading, wiping, dabbing, dipping, etc.

For the purposes of the present invention, the term "paper substrate surface coverage" refers to amount of a paper surface sizing composition present on a given side or surface of the paper substrate being treated. Paper substrate surface coverage may be defined in terms of grams of composition per square meter of paper substrate (hereinafter referred to as "gsm").

For the purposes of the present invention, the term "remains predominantly on the surface(s) of the paper substrate" refers to the paper surface sizing composition or coating remaining primarily on the surface of the paper substrate, and not being absorbed by or into the interior of the paper substrate.

For the purposes of the present invention, the term "flooded nip size press" refers to a size press having a flooded nip (pond), also referred to as a "puddle size press." Flooded nip size presses may include vertical size presses, horizontal size presses, etc.

For the purposes of the present invention, the term "metering size press" refers to a size press that includes a component for spreading, metering, etc., deposited, applied, etc., paper surface sizing composition on a paper substrate side or surface. Metering size presses may include a rod metering size press, a gated roll metering size press, a doctor blade metering size press, etc.

For the purposes of the present invention, the term "rod metering size press" refers to metering size press that uses a rod to spread, meter, etc., the paper surface sizing composition on the paper substrate surface. The rod may be stationary or movable relative to the paper substrate.

For the purposes of the present invention, the term "gated roll metering size press" refers to a metering size press that may use a gated roll, transfer roll, soft applicator roll, etc. The gated roll, transfer roll, soft applicator roll, etc., may be stationery relative to the paper substrate, may rotate relative to the paper substrate, etc.

For the purposes of the present invention, the term "doctor blade metering size press" refers to a metering press which may use a doctor blade to spread, meter, etc., the paper surface sizing composition on the paper substrate surface.

For the purposes of the present invention, the term "metal drying salt" refers to those metal salts which may improve the dry time of inks deposited or printed on printable substrates by ink jet printing processes. These metal drying salts comprise one or more multivalent metal drying salts, and may optionally further comprise one or more monovalent metal drying salts. The counter anions for these metal salts may include, for example, chloride, bromide, acetate, bicarbonate, sulfate, sulfite, nitrate, hydroxide, silicate, chlorohydrate, etc. The metal drying salt may be provided as an aqueous solution comprising, for example, from about 1 to about 60% (e.g., from about 10 to about 40%) of the multivalent metal drying salt.

For the purposes of the present invention, the term "multivalent metal drying salt" refers to those metal drying salts wherein the cationic moiety is a multivalent cation having a positive charge of two or more (e.g., a calcium cation, a magnesium cation, an aluminum cation, etc.) such as calcium salts, magnesium salts, aluminum salts, etc., and which are water soluble. Suitable multivalent metal drying salts (e.g., divalent salts, trivalent salts, etc.) may include one or more of calcium chloride, calcium acetate, calcium hydroxide, calcium nitrate, calcium sulfate, calcium sulfite, magnesium chloride, magnesium acetate, magnesium nitrate, magnesium sulfate, magnesium sulfite, aluminum chloride, aluminum nitrate, aluminum sulfate, aluminum chlorohydrate, sodium aluminum sulfate, vanadium chloride, etc.

For the purposes of the present invention, the term "monovalent metal drying salt" refers to those metal drying salts wherein the cationic moiety is a monovalent cation having a positive charge of one (e.g., a sodium cation, a potassium cation, a lithium cation, etc.) such as sodium salts, potassium salts, lithium salts, etc. Suitable monovalent metal drying salts may include one or more of sodium chloride, sodium acetate, sodium carbonate, sodium bicarbonate, sodium hydroxide, sodium silicates, sodium sulfate, sodium sulfite, sodium nitrate, sodium bromide, potassium chloride, potassium acetate, potassium carbonate, potassium bicarbonate, potassium hydroxide, potassium silicates, potassium sulfate, potassium sulfite, potassium nitrate, potassium bromide, lithium chloride, lithium acetate, lithium carbonate, lithium bicarbonate, lithium hydroxide, lithium silicates, lithium sulfate, lithium sulfite, lithium nitrate, lithium bromide, etc.

For the purposes of the present invention, the term "cationic dye fixing agent" refers to those cationic compounds (e.g., nitrogen-containing compounds) or mixtures of such compounds which may aid in fixing, trapping, etc., inks printed by inkjet printing processes, and which may provide other properties, including water fastness. These cationic dye fixing agents may include compounds, oligomers and polymers which contain one or more quaternary ammonium functional groups, and may include cationic water-soluble polymers that are capable of forming a complex with anionic dyes. Such functional groups may vary widely and may include substituted and unsubstituted amines, imines, amides, urethanes, quaternary ammonium groups, dicyandiamides, guanadines, biguanides, etc. Illustrative of such compounds are polyamines, polyethyleneimines, polymers or copolymers of diallyldimethyl ammonium chloride (DADMAC), copolymers of vinyl pyrrolidone (VP) with quaternized diethylaminoethylmethacrylate (DEAMEMA), polyamides, polyhexamethylene biguanide (PHMB), cationic polyurethane latexes, cationic polyvinyl alcohols, polyalkylamines dicyandiamid copolymers, amine glycidyl addition polymers, poly [oxyethylene(dimethyliminio)ethylene(dimethyliminio)ethylene]dichlorides, etc., or combinations thereof. These cationic dye fixing agents may include low to medium molecular weight cationic polymers and oligomers having a molecular equal to or less than 100,000, for example, equal to or less than about 50,000, e.g., from about 10,000 to about 50,000. Illustrative of such materials are polyalkylamine dicyandiamide copolymers, poly[oxyethylene(dimethyliminio ethylene(dimethyliminioethylene]dichlorides and polyamines having molecular weights within the desired range. Cationic dye fixing agents suitable herein may include low molecular weight cationic polymers such as polyalkylamine dicyandiamid copolymer, poly[oxyethylene (dimethyliminio)ethylene(dimethyliminio)ethylene]dichloride, for example, low molecular weight polyalkylamine dicyandiamid copolymers. See U.S. Pat. No. 6,764,726 (Yang et al.), issued Jul. 20, 2004, the entire disclosure and contents of which is hereby incorporated by reference.

For the purposes of the present invention, the term "opacity" refers to the ability of a paper to hide things such as print images on subsequent sheets or printed on the back, e.g., to minimize, prevent, etc., show-through, etc. As used herein, opacity of the paper substrate may be measured by, for example, in terms of TAPPI opacity and show-through. TAPPI opacity may be measured by T425 om-91.

For the purposes of the present invention, the term "paper smoothness" refers to the extent to which the paper surface deviates from a planar or substantially planar surface, as affected by the depth of the paper, paper width, numbers of departure from that planar surface, etc. As used herein, the paper smoothness of a paper substrate may be measured by, for example, in terms of Parker Print Smoothness. Parker Print Smoothness may be measured by TAPPI test method T 555 om-99.

For the purposes of the present invention, the term "print quality" refers to those factors, features, characteristics, etc., that may influence, affect, control, etc., the appearance, look, form, etc., of a printed image on the printable substrate. Print quality of a paper substrate may be measured in terms of, for example, one or more of: (1) print density; (2) print contrast; (3) dry times); (4) edge acuity; (5) color gamut; (6) color richness; (7) print gloss; (8) print mottle; and (9) color-to-color bleed. For the purposes of the present invention, print quality of the paper substrate is primarily determined herein by measuring the print density, dry time, and edge acuity of the paper substrate.

For the purposes of the present invention, the term "print density" refers to the optical density ("OD") measured by using a reflectance densitometer (X-Rite, Macbeth. Etc.) which measures the light absorbing property of an image printed on a paper sheet. For example, the higher the print density, the darker the print image may appear. Higher print densities also provide a higher contrast, a sharper image for viewing, etc. Print density is measured herein in terms of the black print density (i.e., the print density of images which are black in color). The method for measuring black print density involves printing a solid block of black color on a paper sheet, and then measuring the optical density. The printer used to print the solid block of black color on the paper sheet is an HP Deskjet 6122, manufactured by Hewlett-Packard, (or its equivalent) which uses a #45 (HP product number 51645A) black ink jet cartridge (or its equivalent). The default setting of Plain Paper type and Fast Normal print quality print mode is used in printing the solid block of black color on the paper sheet. An X-Rite model 528 spectrodensitometer with a 6 mm aperture may be used to measure the optical density of the solid block of black color printed on the paper sheet to provide black print density values. The black print density measurement settings used are Visual color, status T, and absolute density mode. In general, acceptable black print density ("$OD_O$") values for black pigment are at least about 1.45 when using a standard (plain paper, normal) print mode for the HP desktop ink jet printer and when using the most common black pigment ink (equivalent to the #45 ink jet cartridge). Some embodiments of the paper substrates of the present invention may exhibit black print density ($OD_O$) values of at least about 1.50, for example, at least about 1.60. See also commonly assigned U.S. Pat. Appln. No. 2007/0087134 (Koenig et al.), published Apr. 19, 2007, the entire disclosure and contents of which is herein incorporated by reference, which describes how to carry out this black print density test.

For the purposes of the present invention, the term "print contrast" refers to the difference in print density between printed and unprinted areas.

For the purposes of the present invention, the term "dry time" refers to the time it takes for deposited ink to dry on the surface of a printable substrate. If the deposited ink does not dry quickly enough, this deposited ink may transfer to other printable substrate sheets, which is undesirable. The percentage of ink transferred ("IT %") is recorded as a measure of the dry time. The higher the amount of the percentage of ink transferred, the slower (worse) the dry time. Conversely, the lower the amount of the percentage of ink transferred, faster (better) the dry time. Embodiments of the paper substrates of the present invention may provide a percent ink transferred ("IT %") value equal to or less than about 65%. In some embodiments of the paper substrates of the present invention, the IT % value may be equal to or less than about 50%, for example, equal to or less than about 40% (e.g., equal to or less than about 30%).

For the purposes of the present invention, the term "ink transfer" refers to a test for determining the dry time of a printable substrate, for example, printable paper sheets. "Ink transfer" is defined herein as the amount of optical density transferred after rolling with a roller, and is expressed as a percentage of the optical density transferred to the unprinted portion of the printable substrate (e.g., paper sheet) after rolling with a roller. The method involves printing solid colored blocks on paper having a basis weight of 20 lbs/1300 ft.$^2$, waiting for a fixed amount of time, 5 seconds after printing, and then folding in half so that the printed portion contacts an unprinted portion of the paper sheet, and rolling with a 4.5 lb hand roller as for example roller item number HR-100 from Chem Instruments, Inc., Mentor, Ohio, USA. The optical density is read on the transferred ($OD_T$), the non-transferred ($OD_O$) portions of the block, and an un-imaged area ($OD_B$) by a reflectance densitometer (X-Rite, Macbeth. Etc.). The percent transferred ("IT %") is defined as IT %=$[(OD_T-OD_B)/(OD_O-OD_B)] \times 100$. See also commonly assigned U.S. Pat. Appln. No. 2007/0087134 (Koenig et al.), published Apr. 19, 2007, the entire disclosure and contents of which is herein incorporated by reference, which describes how to carry out the ink transfer test.

For the purposes of the present invention, the term "edge acuity (EA)" refers to the degree of sharpness (or raggedness) of the edge of a printed image (e.g., a printed line). Edge acuity (EA) may be measured by an instrument such as the QEA Personal Image Analysis System (Quality Engineering Associates, Burlington, Mass.), the QEA ScannerIAS, or the ImageXpert KDY camera-based system. All of these instruments collect a magnified digital image of the sample and calculate an EA value by image analysis. The EA value (also known as "edge raggedness") is defined in ISO method 13660. This method involves printing a solid line 1.27 mm or more in length, and sampling at a resolution of at least 600 dpi. The instrument calculates the location of the edge based on the darkness of each pixel near the line edges. The edge threshold may be defined as the point of 60% transition from the substrate reflectance factor (light area, $R_{max}$) to the image reflectance factor (dark area, $R_{max}$) using the equation $R_{60}=R_{max}-60\% (R_{max}-R_{mm})$. The edge raggedness may then be defined as the standard deviation of the residuals from a line fitted to the edge threshold of the line, calculated perpendicular to the fitted line. For some embodiments of paper substrates of the present invention, the EA value may be less than about 15, for example, less than about 12, such as less than about 10 (e.g., less than about 8). See also commonly assigned U.S. Pat. Appln. No. 2007/0087134 (Koenig et al.), published Apr. 19, 2007, the entire disclosure and contents of which is herein incorporated by reference, which describes how to measure edge acuity (EA) values.

For the purposes of the present invention, the term "color gamut" refers to the total collection of possible colors in any color reproduction system and may be defined by a complete subset colors. A higher color gamut value indicates a more vivid color print quality. Color gamut may be obtained by measuring the CIE L*, a*, b* of a series of color blocks, including white (unprinted area), cyan, magenta, yellow, red, green, blue and black, and from these measured values, calculating a suitable color gamut. The CIE L* represents the whiteness. The value of L* may range from zero (representing black) to 100 (representing white or a perfectly reflecting diffuser). The value of a* represents the degree of green/red. A positive a* is red, while a negative a* is green. A positive b* is yellow, while a negative b* is blue. The CIE L*, a* and b* values may be measured by X-Rite 528 using a D65 light source and a 10-degree viewing angle.

For the purposes of the present invention, the term "color richness" refers to a more vivid or vibrant color print with high print density and high color gamut values.

For the purposes of the present invention, the term "gloss" refers to the ability of paper to reflect some portion of the incident light at the mirror angle. Gloss may be based on a measurement of the quantity of light specularly reflected from the surface of a paper specimen at a set angle, for example, at 75 degrees, such as in the case of 75 degree gloss (and as measured by TAPPI test method T 480 om-92).

For the purposes of the present invention, the term "print gloss" refers to a gloss measurement made on a printed paper substrate.

For the purposes of the present invention, the term "print mottle" refers to non-uniformity in the print image which may be due to unevenness in ink lay, non-uniform ink absorption, etc., across the printable substrate surface. Print mottle may be measured using a scanner based mottle tester such as the C3PATX03 Formation and Mottle Test with an Agfa Model DUOSCAN scanner. The printable substrate (e.g., paper sheet) sample to be tested is first printed on a test ink jet printer. The test pattern must include a block of solid black (100%) image. The color block is a square of about 20-50 mm by 20-50 mm. After 20 minutes of waiting time, or when the printed image is fully dried, the printed sample is positioned on the scanner with printed face down. The scanner is set at a resolution of 500 ppi (pixel per inch). A Verity software (Verity IA LLC, 2114 Sunrise Drive, Appleton, Wis. 54914) may be used to analyze the test data from the scanner. An appropriate dimension for testing based on the color block dimension is set. Two mottle indices may be measured: Micro Mottle Index and Macro Mottle Index. The Micro Mottle Index measures density variations within an area of 0.1 in$^2$; while the macro mottle index measures the density variations of the averaged density values of each square of 0.1 in$^2$. The lower the mottle index value, the better the print quality.

For the purposes of the present invention, the term "color-to-color bleed" refers to the spreading of one color ink into another color ink on paper which may reduce the resolution of the colored text and lines on a colored background. For example blue and black bars may be printed over a yellow color background. Green and black bars may be printed over magenta color background, and red and black bars may be printed over cyan color background. The smallest distance in microns between two color bars without bridging (or color intruding more than half way to the neighboring color bar) is recorded as the color-to-color bleed index. In other words, the smaller the value of color-to-color bleed, the better the print quality. Distances which may be tested include 50 microns, 100 microns, 150 microns, 300 microns, etc. In some embodiments of the present invention, the tested distance may reach 150 microns or less before bridging (bleed) occurs, which may be considered a "good" color-to-color bleed property.

For the purposes of the present invention, the term "digital printing" refers to reproducing, forming, creating, providing, etc., digital images on a printable substrate, for example, paper, Digital printing may include laser printing, ink jet printing, etc.

For the purposes of the present invention, the term "laser printing" refers to a digital printing technology, method, device, etc., that may use a laser beam to create, form produce, etc., a latent image on, for example, photoconductor drum. The light of laser beam may later create charge on the drum which may then pick up toner which carries an opposite charge. This toner may then be transferred to the paper and the resulting print image created, formed, produced, etc., fused to the printable substrate through, for example, a fuser.

For the purposes of the present invention, the term "electrophotographic recording process" refers to a process which records images on a printable substrate, such as paper, by xerography or electrophotography. In an electrophotographic process, the image is often formed on of the c by toner particles which are deposited one surface or side of the printable substrate, and are then thermally fixed and/or fused to that one surface or side of the printable substrate, for example, by heating. In electrophotographic recording, the printable substrate may have two relatively smooth or flat sides or surfaces, or may have one side or surface which is textured, uneven or nonsmooth/nonflat, while the other side or surface is relatively smooth or flat.

For the purposes of the present invention, the term "ink jet printing" refers to a digital printing technology, method, device, etc., that may form images on a printable substrate, such as a paper substrate, by spraying, jetting, etc., tiny droplets of liquid inks onto the printable substrate through the printer nozzles. The size (e.g., smaller size), precise placement, etc., of the ink droplets may be provide higher quality inkjet prints. Ink jet printing may include continuous ink jet printing, drop-on-demand ink jet printing, etc.

For the purposes of the present invention, the term "liquid" refers to a non-gaseous fluid composition, compound, material, etc., which may be readily flowable at the temperature of use (e.g., room temperature) with little or no tendency to disperse and with a relatively high compressibility.

For the purposes of the present invention, the term "viscosity," with reference to paper surface sizing compositions, refers to Brookfield viscosity. The Brookfield viscosity may be measured by a Brookfield viscometer at 150° F., using a #5 spindle at 100 rpm.

For the purpose of the present invention, the term "printer" refers to any device which prints an image on a printable substrate, such as a paper sheet, including laser printers, inkjet printers, electrophotographic recording devices (e.g., copiers), scanners, fax machines, etc.

For the purpose of the present invention, the term "printer pigment" may refer to either ink (as used by, for example, an inkjet printer, etc.) and toner (as used by, for example, a laser printer, electrographic recording device, etc.).

For the purpose of the present invention, the term "ink" refers printer pigment as used by ink jet printers. The term ink may include dye-based inks and/or pigment-based inks. Dye-based inks comprise a dye which may be an organic molecule which is soluble in the ink medium. Dye-based inks may be classified by their usage, such as acid dyes, basic dyes, or direct dyes, or by their chemical structure, such as azo dyes, which are based on the based on an —N=N— azo structure; diazonium dyes, based on diazonium salts; quinone-imine dyes, which are derivates of quinine, etc. Pigment-based dyes comprise a pigment, which is a solid colored particle suspended in the ink medium. The particle may comprise a colored mineral, a precipitated dye, a precipitated dye which is attached to a carrier particle, etc. Inks are often dispensed, deposited, sprayed, etc., on a printable medium in the form of droplets which then dry on the printable medium to form the print image(s).

For the purpose of the present invention, the term "toner" refers printer pigment as used by laser printers. Toner is often dispensed, deposited, etc., on the printable medium in the form of particles, with the particles then being fused on the printable medium to form the image.

For the purposes of the present invention, the term "room temperature" refers to the commonly accepted meaning of room temperature, i.e., an ambient temperature of 20° to 25° C.

For the purpose of the present invention, the term "Hercules Sizing Test" or "HST" refers to a test of resistance to penetration of, for example, an acidic water solution through paper. The HST may be measured using the procedure of TAPPI Standard Method 530 pm-89. See U.S. Pat. No. 6,764,726 (Yang et al.), issued Jul. 20, 2004, the entire disclosure and contents of which is hereby incorporated by reference. The HST value is measured following the conventions described in TAPPI Standard Method number T-530 pm-89, using 1% formic acid ink and 80% reflectance endpoint. The HST value measured reflects the relative level of paper sizing present in and/or on the paper substrate. For example, lower HST values (i.e., HST values below about 50 seconds) reflect a relatively low level of paper sizing present in the paper substrate. Conversely, higher HST values (i.e., HST values above about 250 seconds) reflect a relatively high level of paper sizing present in and/or on the paper substrate. For the purposes of the present invention, an HST value in the range from about 50 to about 250 seconds is considered to be an intermediate HST value reflecting an intermediate level of paper sizing present in and/or on the paper substrate. The HST value measured also reflects both the level of both internal paper sizing, as well as the level of surface paper sizing present. But at the relatively low levels of paper sizing agents normally used in papermaking (e.g., from about 1 to about 2 lbs/ton or from about 0.04 to about 0.08 gsm for paper having a basis weight of 20 lbs/1300 ft.$^2$), the HST value of the paper substrate primarily (if not exclusively) reflects the contribution imparted by the internal paper sizing agents (which generally increase HST values greatly even at low usage levels), rather than surface paper sizing agents (which generally increase HST values minimally at such low usage levels).

Description

Embodiments of the method and system of the present invention relate to inhibiting deposits on a paper surface sizing equipment, machines, devices, etc., of multivalent fatty acid salts, and in particular, multivalent $C_{16}$ or higher saturated fatty acid salts such as calcium palmitate, wherein one or more surfaces of a paper substrate are treated with a paper surface sizing composition, as well as a source of multivalent cations (such as a multivalent metal drying salts) in an amount sufficient to provide a level of multivalent cations of at least about 0.1% (i.e., 1000 ppm). In embodiments of the method of the present invention, a cooked paper surface sizing composition may be provided which comprises above about 10% cooked surface sizing starch solids (for example, above about 12% starch solids), and no more than about 300 ppm (e.g., no more than about 250 ppm) $C_{16}$ or higher saturated fatty acids and wherein the cooked surface sizing starch solids comprise from 0 to about 95% high fatty acid surface sizing starch from about and from about 5 to 100% low fatty acid surface sizing starch (e.g., from 0 to about 90% high fatty acid surface sizing starch and from about 10 to 100% low fatty acid surface sizing starch). For example, the cooked surface sizing starch solids may comprise from about 15 to about 85% high fatty acid surface sizing starch and from about 15 to about 85% low fatty acid surface sizing starch (e.g., from about 30 to about 70% high fatty acid surface sizing starch and from about 30 to 70% low fatty acid surface sizing starch), i.e., mixtures of high fatty acid and low fatty acid surface sizing starches.

Embodiments of the system of the present invention may comprise: a source of a paper surface sizing composition comprising above about 10% surface sizing starch solids, wherein the surface sizing starch solids comprise from 0 to about 95% high fatty acid surface sizing starch and from about 5 to 100% low fatty acid surface sizing starch; a starch cooking stage which cooks the surface sizing starch solids in the paper surface sizing composition and thus liberates fatty acids from the cooked surface sizing starch solids, wherein the liberated fatty acids comprise no more than about 300 ppm (e.g., no more than about 250 ppm) $C_{16}$ or higher saturated fatty acids; a fatty acid neutralization stage which neutralizes and converts the liberated fatty acids in the cooked paper surface sizing composition to monovalent fatty acid salts; a source of a multivalent metal drying salt; and a paper surface sizing device wherein at least one surface of a paper substrate is treated with the neutralized paper surface sizing composition and the multivalent metal drying salt.

It has been found, for example, that high fatty acid surface sizing starches such as non-waxy cereal starches (e.g., non-way maize (corn) starch or non-waxy wheat starch) used in paper surface sizing compositions, when cooked, may liberate significant amounts of fatty acids and especially saturated fatty acids such as palmitic acid. For example, corn starch and wheat starch may comprise upwards of as much as about 1% fatty acids which may be liberated during starch cooking, of which upwards of as much as about 35% of these fatty acids comprise palmitic acid.

Because starch is generally insoluble in cold water, an aqueous suspension of starch granules and water is often formed, which is then heated (cooked) to enable the water to penetrate the starch granules and thus cause these cooked granules to swell to provide a gelatinized paste or solution of cooked starch solids. After the high fatty acid starch is cooked, this solution of cooked starch solids contains liberated fatty acids which may then be neutralized with a monovalent hydroxide, such as sodium hydroxide (e.g., 1N), such that the neutralized solution has a pH, for example, of up to about 7.5, to control the pH of the cooked starch solution.

This neutralized starch solution comprises monovalent fatty acids, including monovalent saturated fatty acid salts, such as sodium palmitate.

To provide energy savings, increased surface strength in the paper substrate, increased additive efficiency in the paper surface sizing composition, etc., it may be desirable to use a cooked starch solution having a relatively high level of surface sizing starch solids (i.e., above about 10% starch solids). When the level of cooked high fatty acid starch solids is relatively high, the amount of fatty acids, and in particular saturated fatty acids, such as palmitic acid, which are liberated may also be relatively high. For example, at starch solids levels greater than about 10%, it has been calculated that the amount of palmitic acid present in these cooked high fatty acid starch solutions may be above about 300 ppm or even above about 400 ppm. When these cooked high fatty acid starch solutions are neutralized, the resulting neutralized starch solution may also provide a relatively high level of saturated fatty acid salts, such as sodium palmitate.

After cooking and neutralization, these neutralized paper surface sizing compositions comprising higher amounts of, for example, high fatty acid surface sizing starch solids (and thus higher levels of saturated fatty acid salts) may then be applied to the surface of the paper substrate, for example, at a size press. When a source of multivalent cations, such as calcium chloride, used as a metal drying salt agent, is also introduced at the size press (e.g., at levels of at least about 0.1% (i.e., 1000 ppm), for example, as a solution of calcium chloride, multivalent saturated fatty acid salts, such as calcium palmitate, may be formed. These multivalent saturated fatty acid salts, such as calcium palmitate, which are formed by adding the multivalent metal drying salt (e.g., calcium chloride) solution at the size press may cause these multivalent saturated fatty acid salts (e.g., calcium palmitate) which are at relatively high levels to precipitate out of paper surface sizing compositions. These precipitated multivalent saturated fatty acid salts (e.g., calcium palmitate) may then form undesirable multivalent saturated fatty acid salt deposits on the size press or on other equipment, devices, etc., after the size press.

To avoid or minimize formation of these multivalent saturated fatty acid salt (e.g., calcium palmitate) deposits, the non-waxy cereal starches which liberate substantial levels of fatty acids ("high fatty acid" surface sizing starches) may be replaced (wholly or partially) with one or more starches which liberate lower levels of such fatty acids (i.e., "low fatty acid" surface sizing starches). Such low fatty acid surface sizing starches may include, for example, non-cereal starches, such as tapioca starch, as well as waxy cereal starches such as waxy maize (corn) starch, waxy rice starch and waxy potato starch. It has been found that, when cooked, these low fatty acid surface sizing starches (which primarily comprise amylopectin) liberate lower levels of fatty acids, and in particular saturated fatty acids such as palmitic acid and other $C_{16}$ or higher saturated fatty acids relative to high fatty acid surface sizing starches, such as non-waxy cereal starches (which comprise significant levels of amylose, in addition to amylopectin). Accordingly, paper surface sizing compositions may be formulated solely with such low fatty acid surface sizing starches, or with mixtures of these low fatty acid surface sizing starches and high fatty acid surface sizing starches such that the amount of liberated fatty acids (including liberated $C_{16}$ or higher saturated fatty acids) is no more than about 300 ppm, for example, no more than about 250 ppm) in the cooked paper surface sizing composition (based on total starch solids).

Besides avoiding or minimizing multivalent saturated fatty acid salt deposits, surface sized printable substrates obtained by embodiments of the method and system of the present invention may also provide other benefits such as improved dry times (in terms of reduced percent ink transfer transferred), acceptable print density (measured in terms of black print density values) and edge acuity (EA), etc. For example, the multivalent metal drying salt may be present in amounts sufficient to impart to the treated surfaces of these paper substrates improved dry times, as measured by percent ink transferred (IT %) values, for example, equal to or less than about 65%. In some embodiments of these paper substrates, the amount of the multivalent metal drying salt may be sufficient to impart a IT % value equal to or less than about 50%, for example, equal to or less than about 40% (e.g., equal to or less than about 30%).

The presence of these multivalent metal drying salts on the paper substrate surface destabilizes the pigment emulsion in the ink droplets deposited by an ink jet printer. The resulting destabilization of the pigment emulsion causes precipitation of pigment particles, thus resulting in a faster and improved dry time. For embodiments of these paper substrates, coverage of one or both surfaces of the paper surfaces with, for example, from about 0.2 to about 1.2 gsm (e.g., from about 0.5 to about 1 gsm) of such multivalent metal drying salts may impart to the treated paper substrate surface dry times as specified above in terms of maximum IT % values.

These improved dry times by using multivalent metal drying salts may be achieved with paper substrates which may have sizing values (as measured by the Hercules Sizing Test or HST) in the range of from about 1 to about 400 seconds, such as intermediate HST values in the range of from about 50 to about 250 seconds, for example, a HST value of from about 60 to about 200 seconds, such as from about 70 to about 160 seconds. At these HST values, such as the intermediate HST values (i.e., from about 50 to about 250 seconds), the use of the multivalent metal drying salts (e.g., calcium chloride) may achieve acceptable and even improved print densities for the paper substrates. For example, embodiments of these paper substrates may achieve print densities (in terms of black print density values) of at least about 1.45 (e.g., at least about 1.50).

Embodiments of the methods and systems of the present invention may use paper substrates treated with an internal paper sizing agent. In embodiments of the methods and systems of the present invention, one or both surfaces of these internally sized paper substrates are further be treated with a paper surface sizing composition comprising the (cooked) surface sizing starch solids comprising the low fatty acid surface size starches (or mixtures of low fatty acid surface size starches and high fatty acid surface size starches) at higher solids levels (i.e., at starch solids levels above about 10%), as well as the multivalent metal drying salt(s) (and optionally monovalent metal drying salt(s)) in amounts sufficient to provide paper substrates with dry times as specified above in terms of percent ink transferred ("IT %") values (e.g., equal to or less than about 65%). Coverage of one or both surfaces of these internally sized paper substrates with these paper surface sizing compositions may be sufficient to provide coverage on each of the respective surfaces treated of, for example, from about 2 to about 6 gsm starch solids (e.g., from about 3 to about 5 gsm starch solids), along with coverage of the multivalent metal drying salt on each of the respective surfaces treated of, for example, from about 0.2 to about 1.2 gsm (e.g., from about 0.5 to about 1 gsm, of the multivalent metal drying salt), for a paper of a basis weight of 20 lbs/1300 square feet.

Embodiments of the paper surface sizing compositions used in these methods and systems may comprise the (cooked) surface sizing starch solids comprising the low fatty acid surface size starches (or mixtures of low fatty acid surface size starches and high fatty acid surface size starches) in an amount of above about 10% by weight (e.g., above about 12% by weight), and in amounts, for example, as high as about 50% by weight, such as high as about 40% by weight (e.g., as high as about 30% by weight) of the composition (on a solids basis). In addition to the high fatty acid starch, embodiments of the paper surface sizing composition used in these methods and systems may also optionally comprise one or more of the following: a calcium carbonate pigment component in an amount of up to about 25% by weight (e.g., from about from about 10 to about 60% by weight) of the composition (on a solids basis); other paper surface sizing agents in amount of up to about 5% by weight (e.g., from about from about 0.5 to about 2% by weight) of the composition (on a solids basis); a cationic dye fixing agent in an amount up to about 20% by weight (e.g., from about 5 to about 15% by weight) of the composition (on a solids basis); a pigment binder in an amount of up to about 90% by weight (e.g., from about 5 to about 75% by weight) of the composition (on a solids basis); a plastic pigment in an amount of up to about 30% by weight (e.g., from 0 to about 20% by weight) of the composition (on a solids basis); and an optical brightening agent in an amount of up to about 30% by weight (e.g., from about 0 to about 10% by weight) of the composition (on a solids basis).

The paper surface sizing composition may comprise from about 10 to about 60_% solids (e.g., from about 12 to about 50% solids). The amount of solids applied from the paper surface sizing composition to the paper substrate surfaces (also referred to as "dry pickup") may, for example, be in the range of from about 50 to about 200 lbs/ton for a paper substrate with basis weight of 20 lbs/1300 square feet (e.g., from about 60 to about 150 lbs/ton). These dry pickups are equivalent to amounts in the range of from about 2 to about 6 grams per square meter (gsm) for a paper substrate with basis weight of 20 lbs/1300 square feet (e.g., from about 70 to about 75 gsm).

An embodiment of a paper surface sizing system of the present invention is illustrated in FIG. 1 and is generally indicated as 100. Referring to FIG. 1, system 100 comprises a source of a paper surface sizing solution, indicated as 102, which comprises water and one or more low fatty acid surface sizing starches (and optionally one or more high fatty acid surface sizing starches such that no more than about 300 ppm $C_{16}$ or higher saturated fatty acids are liberated in the subsequent starch cooking stage) in amount sufficient to provide above about 10% starch solids. Sizing solution 102 is directed, transferred, piped, streamed, etc., as indicated by arrow 104, to a starch cooking stage, indicated as 106. Starch cooking stage 106 cooks the starch solids in sizing solution 102 to thereby swell and gelatinize these starch solids, but also at the same time liberates fatty acids, including $C_{16}$ or higher saturated fatty acids.

The cooked sizing solution from cooking stage 106 is then directed, transferred, piped, streamed, etc., as indicated by arrow 108, to a fatty acid neutralization stage, indicated as 110. A source of monovalent hydroxide (e.g., sodium hydroxide), indicated as 112, is then added, etc., as indicated by arrow 114, the cooked sizing solution 108 in neutralization stage 110 to thereby neutralize and convert (wholly or at least partially) the liberated fatty acids, including the $C_{16}$ or higher saturated fatty acids, to the respective monovalent fatty acid salts.

As shown in FIG. 1, a paper substrate, indicated as 116, is passed, transferred, streamed, etc., as indicated by arrow 118, to a size press, as indicated by 120. As indicated by arrow 122, the neutralized sizing solution is directed, transferred, piped, etc., to size press 120 to treat one or both surfaces of paper substrate 116 with the neutralized sizing solution 122. As also shown in FIG. 1, a source (e.g., a solution) of multivalent metal drying salts (e.g., an aqueous calcium chloride solution), indicated as 124, is directed, transferred, piped, streamed, etc., as indicated by arrow 126, to size press 120 to treat one or both surfaces of paper substrate 116 directly or as part of the neutralized sizing solution 122. As indicated by arrow 128, the sized paper substrate, indicated as 130, exits size press 120.

Figure 2:
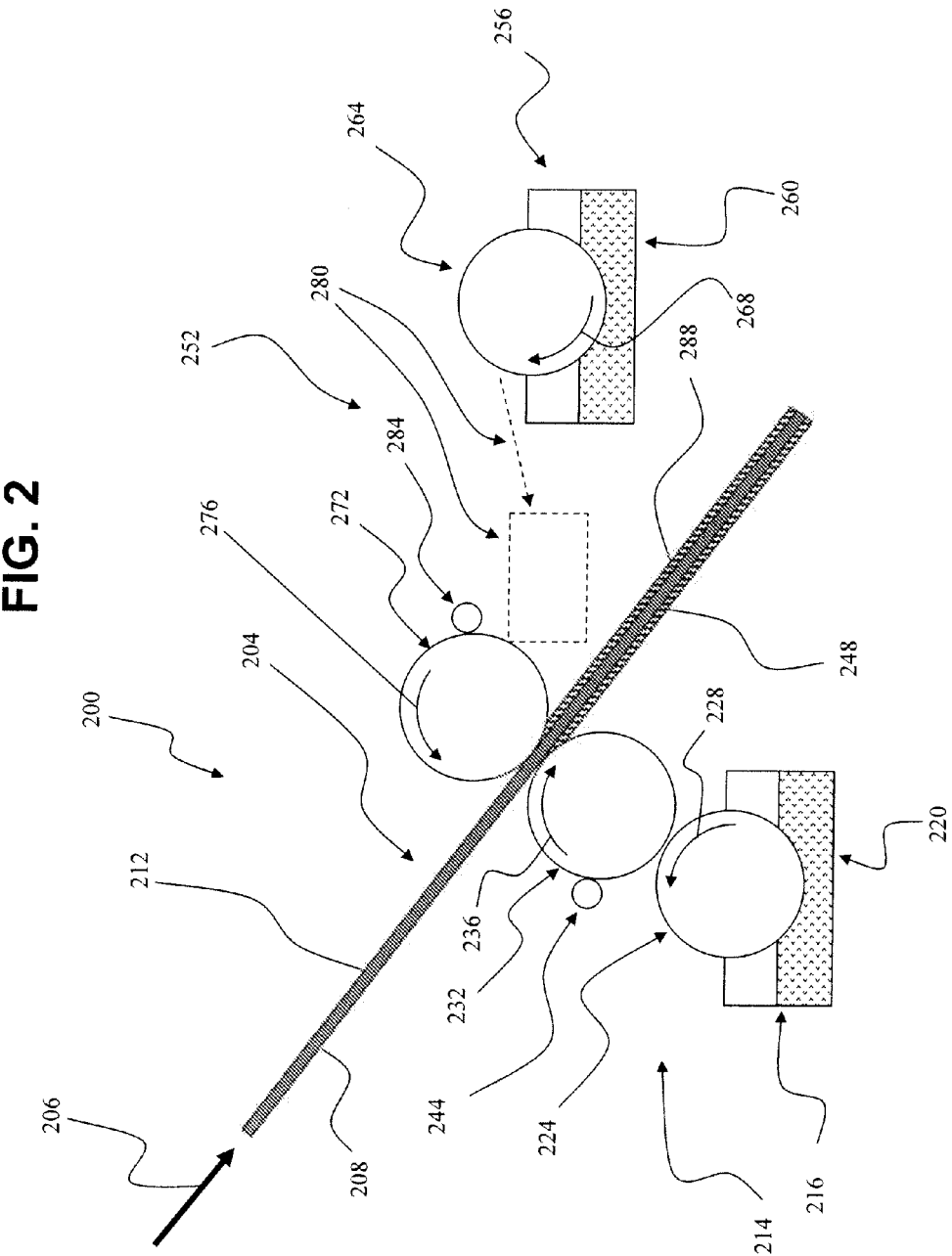
FIG. 2 a schematic diagram illustrating an embodiment of a method for treating one or both surfaces of a paper substrate with a paper surface sizing composition comprising using a metering rod size press.

An embodiment of a method of the present invention for treating one or both surfaces of the paper substrate with a paper surface sizing composition comprising, for example, water and one or more low fatty acid surface sizing starches (and optionally one or more high fatty acid surface sizing starches such that no more than about 300 ppm (e.g., no more than about 250 ppm) $C_{16}$ or higher saturated fatty acids are liberated in the subsequent starch cooking stage) in amount sufficient to provide above about 10% starch solids, and a multivalent metal drying salt (e.g., calcium chloride) which is added as an aqueous solution with, or as part of, the paper surface sizing composition (after neutralization and conversion of the liberated fatty acids in the paper surface sizing composition) is further illustrated in FIG. 2. Referring to FIG. 2, an embodiment of a system for carrying out an embodiment of the method of the present invention is illustrated which may be in the form of, for example a rod metering size press indicated generally as 200. Size press 200 may be used to coat a paper substrate, indicated generally as 204, with a paper surface sizing composition. Substrate 204 moves in the direction indicated by arrow 206, and which has a pair of opposed sides or surfaces, indicated, respectively, as 208 and 212.

Size press 200 includes a first assembly, indicated generally as 214, for applying the paper surface sizing composition to surface 208. Assembly 214 includes a first reservoir, indicated generally as 216, provided with a supply of a paper surface sizing composition, indicated generally as 220. A first take up roll, indicated generally as 224 which may rotate in a counterclockwise direction, as indicated by curved arrow 228, picks up an amount of the paper surface sizing composition from supply 220. This amount of paper surface sizing composition that is picked up by rotating roll 224 may then be transferred to a first applicator roll, indicated generally as 232, which rotates in the opposite and clockwise direction, as indicated by curved arrow 236. (The positioning of first take up roll 224 shown in FIG. 2 is simply illustrative and roll 224 may be positioned in various ways relative to first applicator roll 232 such that the paper surface sizing composition is transferred to the surface of applicator roll 232.) The amount of paper surface sizing composition that is transferred to first applicator roll 232 may be controlled by metering rod 244 which spreads the transferred composition on the surface of applicator roll 232, thus providing relatively uniform and consistent thickness of a first coating, indicated as 248, of paper surface sizing composition when applied onto the first surface 208 of substrate 204 by applicator roll 232.

As shown in FIG. 2, size press 100 may also be provided with a second assembly indicated generally as 252, for applying the paper surface sizing composition to surface 212. Assembly 252 includes a second reservoir indicated generally as 256, provided with a second supply of a paper surface sizing composition, indicated generally as 260. A second take up roll, indicated generally as 264 which may rotate in a clockwise direction, as indicated by curved arrow 268, picks up an amount of the paper surface sizing composition from supply 260. This amount of paper surface sizing composition that is picked up by rotating roll 264 may then be transferred to second take up roll, indicated generally as 272, which rotates in the opposite and counterclockwise direction, as indicated by curved arrow 276. As indicated in FIG. 2 by the dashed-line box and arrow 276, second take up roll 264 may be positioned in various ways relative to second applicator roll 272 such that the paper surface sizing composition is transferred to the surface of applicator roll 272. The amount of paper surface sizing composition that is transferred to second applicator roll 272 may be controlled by a second metering rod 284 which spreads the transferred composition on the surface of applicator roll 272, thus providing relatively uniform and consistent thickness of the second coating of paper surface sizing composition, indicated as 288, when applied onto the second surface 212 of substrate 204 by applicator roll 272.

Figure 3:
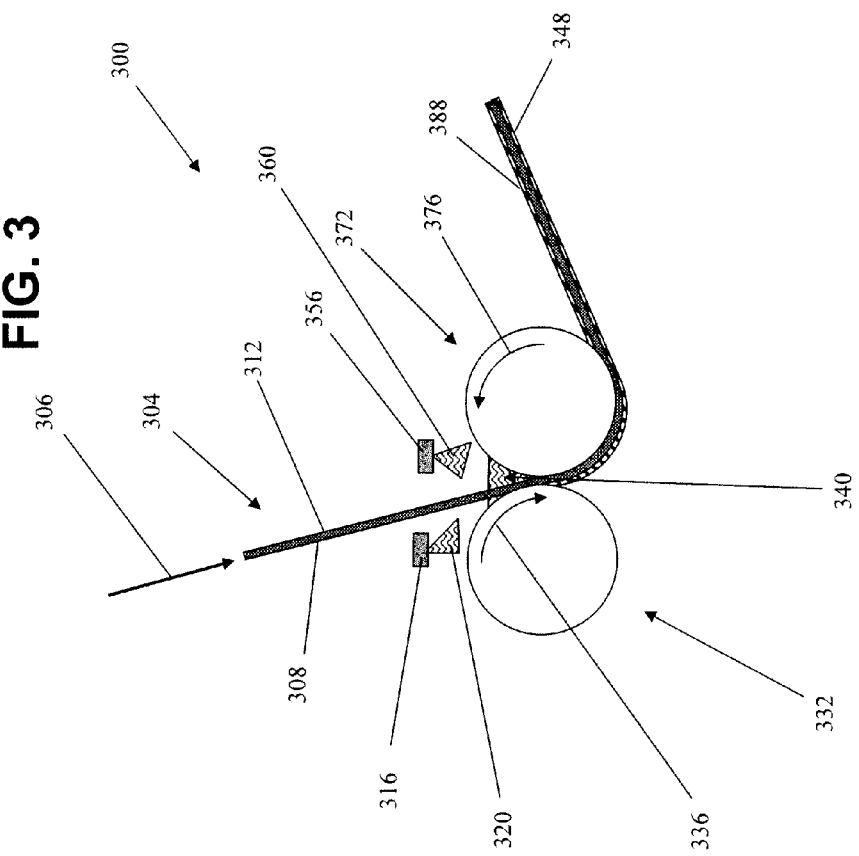
FIG. 3 is a schematic diagram illustrating an embodiment of a method for treating one or both surfaces of a paper substrate with a paper surface sizing composition using a horizontal flooded nip size press.

Referring to FIG. 3, another embodiment of a system for carrying out an embodiment of the method of the present invention is illustrated which may be in the form of, for example, a horizontal flooded nip size press indicated generally as 300. Horizontal size press 300 may be used to coat a paper web, indicated generally as 304, with a paper surface sizing composition (e.g., as described in FIG. 2 above). Web 304 moves in the direction indicated by arrow 306, and has a pair of opposed sides or surfaces, indicated, respectively, as 308 and 312.

Horizontal size press 300 includes a first source of paper surface sizing composition, indicated generally as nozzle 316, which is sprays a stream of paper surface sizing composition, indicated by 320, generally downwardly towards the surface of a first transfer roll, indicated as 332, which rotates in a clockwise direction, as indicated by curved arrow 336. A flooded pond or puddle, indicated generally as 340, is created at the nip between first transfer roll 332 and second transfer roll 372 due to a bar or dam (not shown) positioned at below the nip. Transfer roll 332 transfers a relatively uniform and consistent thickness of a first coating of the paper surface sizing composition, indicated as 348, onto the first surface 308 of web 304.

A second source of paper surface sizing composition, indicated generally as nozzle 356, which is sprays a stream of paper surface sizing composition, indicated by 360, generally downwardly towards the surface of a second transfer roll, indicated as 372, which rotates in a counterclockwise direction, as indicated by curved arrow 376. Transfer roll 372 transfers a relatively uniform and consistent thickness of a second coating of the paper surface sizing composition, indicated as 388, onto the second surface 312 of web 304.

Figure 4:
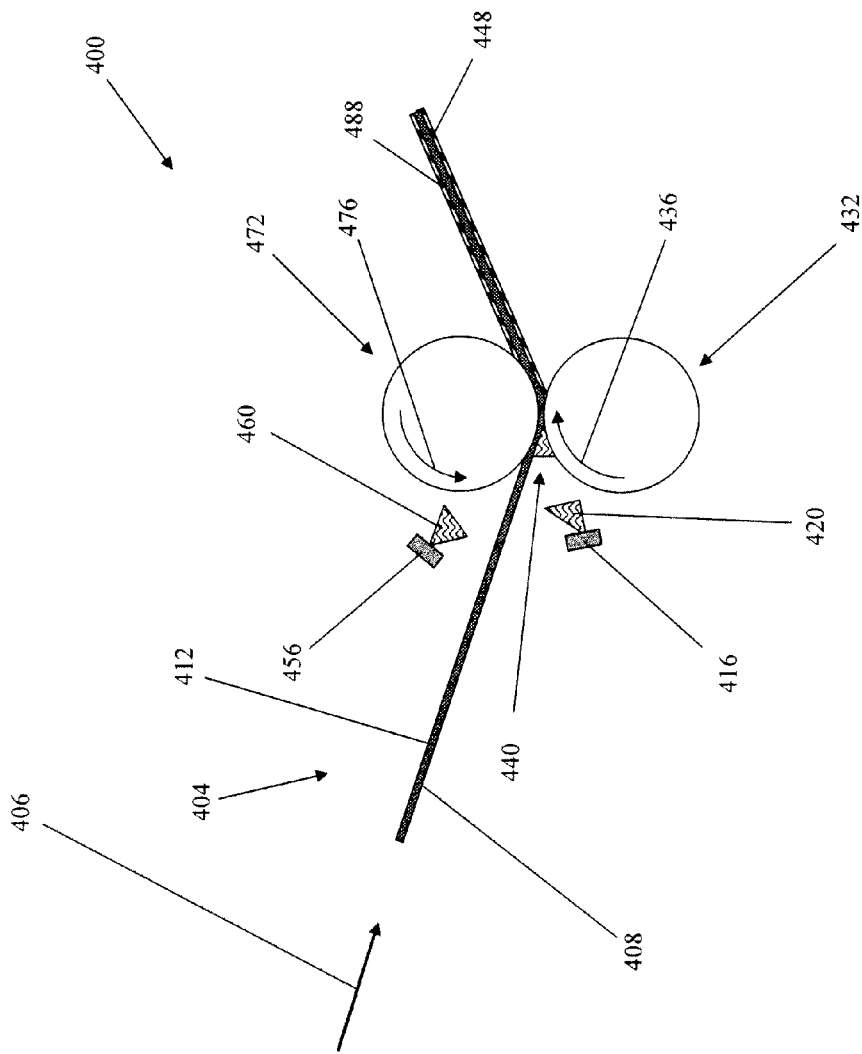
FIG. 4 is a schematic diagram illustrating an embodiment of a method for treating one or both surfaces of a paper substrate with a paper surface sizing composition using a vertical flooded nip size press.

Referring to FIG. 4, another embodiment of a system for carrying out an embodiment of the method of the present invention is illustrated which may be in the form of, for example, a vertical flooded nip size press indicated generally as 400. Vertical size press 300 may be used to coat a paper web, indicated generally as 404, with a paper surface sizing composition (e.g., as described in FIG. 2 above). Web 404 moves in the direction indicated by arrow 306, and has a pair of opposed sides or surfaces, indicated, respectively, as 408 and 412.

Vertical size press 400 includes a first source of paper surface sizing composition, indicated generally as nozzle 416, which is sprays a stream of paper surface sizing composition, indicated by 420, generally upwardly and towards the surface of a first lower transfer roll of the roll stack, indicated as 432, which rotates in a clockwise direction, as indicated by curved arrow 436. A smaller flooded pond or puddle, indicated generally as 440, (compared to the pond or puddle 340 of horizontal size press 300) is created at the nip between lower first transfer roll 432 and second upper transfer roll 472 due to a bar or dam (not shown) positioned to right of the nip. Transfer roll 432 transfers a relatively uniform and consistent thickness of a first coating of the paper surface sizing composition, indicated as 448, onto the lower first surface 408 of web 404.

A second source of paper surface sizing composition, indicated generally as nozzle 456, sprays a stream of paper surface sizing composition, indicated by 460, generally downwardly and towards the surface of a second upper transfer roll, indicated as 472, which rotates in a counterclockwise direction, as indicated by curved arrow 476. Transfer roll 472 transfers a relatively uniform and consistent thickness of a second coating of the paper surface sizing composition, indicated as 488, onto the upper second surface 412 of web 404.

All documents, patents, journal articles and other materials cited in the present application are hereby incorporated by reference.

Although the present invention has been fully described in conjunction with several embodiments thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. A method for inhibiting deposits of multivalent $C_{16}$ or higher fatty acid salts on paper surface sizing equipment when treating at least one surface of a paper substrate with a cooked paper surface sizing solution and a solution of multivalent cations, comprising the following steps of:
    (a) to a cooked paper surface sizing composition comprising above about 10% cooked surface sizing starch solids and no more than about 300 ppm $C_{16}$ or higher saturated fatty acids, wherein the cooked surface sizing starch solids comprise from 0 to about 95% high fatty acid surface sizing starch and from about 5 to 100% low fatty acid surface sizing starch, adding a monovalent hydroxide to thereby neutralize and convert the total fatty acids to monovalent fatty acid salts to thereby provide a cooked and neutralized paper surface sizing solution;
    (b) treating at least one surface of a paper substrate with the cooked and neutralized paper surface sizing solution to thereby, provide a surface sizing coating on the at least one surface; and
    (c) in the presence of the cooked and neutralized paper surface sizing solution of step (b), adding a solution of multivalent cations comprising a level of at least about 1000 ppm of the multivalent cations to thereby treat the at least one surface with the multivalent cations.

2. The method of claim 1, wherein the cooked surface sizing starch solids of step (a) comprise from 0 to about 90% high fatty acid surface sizing starch and from about 10 to 100% low fatty acid surface sizing starch.

3. The method of claim 1, wherein the cooked surface sizing starch solids of step (a) comprise from about 15 to about 85% high fatty acid surface sizing starch and from about 15 to about 85% low fatty acid surface sizing starch.

4. The method of claim 3, wherein the cooked surface sizing starch solids of step (a) comprise from about 30 to about 70% high fatty acid surface sizing starch and from about 30 to about 70% low fatty acid surface sizing starch.

5. The method of claim 1, wherein the high fatty acid surface sizing starch of step (a) comprises one or more surface sizing non-waxy cereal starches.

6. The method of claim 5, wherein the non-waxy cereal starches of step (a) comprises one or more of non-waxy maize (corn) starch and non-waxy wheat starch.

7. The method of claim 1, wherein the low fatty acid surface sizing starch of step (a) comprise one or more of tapioca starch and waxy cereal starch.

8. The method of claim 7, wherein the low fatty acid surface sizing starch of step (a) comprises one or more of waxy maize (corn) starch, waxy rice starch, and waxy potato starch.

9. The method of claim 1, wherein the solution of multivalent cations of step (c) comprises a multivalent metal drying salt in an amount sufficient to impart to the treated at least one surface a dry time, as measured by a percent ink transferred (IT %) value, equal to or less than about 65%.

10. The method of claim 1, wherein the cooked paper surface sizing composition comprises above about 12% cooked surface sizing starch solids.

11. The method of claim 1, wherein the cooked paper surface sizing solution is raised to a pH of from about 6 to about 9 during step (a).

12. The method of claim 9, wherein the multivalent metal drying salt is a divalent metal drying salt.

13. The method of claim 12 wherein the divalent metal drying salt is one or more of: a calcium salt; or a magnesium salt.

14. The method of claim 13 wherein the divalent metal drying salt is one or more of: calcium chloride; calcium acetate; calcium hydroxide; calcium nitrate; calcium sulfate; calcium sulfite; magnesium chloride; magnesium acetate; magnesium nitrate; magnesium sulfate; or magnesium sulfite.

15. The method of claim 14, wherein the multivalent metal drying salt is calcium chloride.

16. The method of claim 1, wherein step (b) is carried by coating the at least one surface with the cooked and neutralized paper surface sizing solution using a size press.

17. The method of claim 16, wherein step (c) is carried out by adding the solution of multivalent cations as part of the cooked and neutralized paper surface sizing solution of step (b).

18. The method of claim 16, wherein step (c) is carried out by using the size press to directly add the solution of multivalent cations to at least one surface.

\* \* \* \* \*